United States Patent
Vaid et al.

(10) Patent No.: US 8,135,723 B2
(45) Date of Patent: Mar. 13, 2012

(54) LEVERAGING LOW-LATENCY MEMORY ACCESS

(75) Inventors: Kushagra V. Vaid, Sammamish, WA (US); Gaurav Sareen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 503 days.

(21) Appl. No.: 12/269,877

(22) Filed: Nov. 12, 2008

(65) Prior Publication Data

US 2010/0121865 A1    May 13, 2010

(51) Int. Cl.
*G06F 7/00*    (2006.01)
(52) U.S. Cl. .................... 707/755; 711/100; 709/217
(58) Field of Classification Search .......... 707/755, 707/758, 999.01, 999.205; 711/100, 147, 711/157; 709/217–226
See application file for complete search history.

(56) References Cited

U.S. PATENT DOCUMENTS

| | | | |
|---|---|---|---|
| 6,052,802 A * | 4/2000 | Zahir et al. ............... | 714/47.3 |
| 6,247,109 B1 | 6/2001 | Kleinsorge et al. | |
| 6,334,177 B1 | 12/2001 | Baumgartner et al. | |
| 6,542,926 B2 | 4/2003 | Zalewski et al. | |
| 6,662,276 B2 * | 12/2003 | Schoinas ............... | 711/145 |
| 7,222,224 B2 * | 5/2007 | Woo et al. ............... | 711/167 |
| 7,383,396 B2 * | 6/2008 | Wyman ............... | 711/141 |
| 2006/0020940 A1 | 1/2006 | Culter | |
| 2006/0259704 A1 * | 11/2006 | Wyman ............... | 711/141 |
| 2007/0192372 A1 | 8/2007 | Bestgen et al. | |
| 2007/0260621 A1 | 11/2007 | Smolen et al. | |
| 2008/0256330 A1 * | 10/2008 | Wang et al. ............... | 712/24 |

OTHER PUBLICATIONS

Lawson, et al., "SQL Server 2005 on the IBM server xSeries 460 Enterprise Server", Retrieved at <<http://www.redbooks.ibm.com/redpapers/pdfs/redp4093.pdf>>, Dec. 2005, pp. 92.
Newman, et al., "Server Consolidation with VMware ESX Server", Retrieved at <<http://www.redbooks.ibm.com/redpapers/pdfs/redp3939.pdf>>, Jan. 2005, pp. 158.
Ramanujan, et al., "A Framework for Automated Software Partitioning and Mapping for Distributed Multiprocessors", Retrieved at <<http://ieeexplore.ieee.org/iel3/3753/10958/00508973.pdf?tp=&isnumber=&arnumber=508973&htry=0>>, IEEE 1996, pp. 138-145.

* cited by examiner

*Primary Examiner* — Shahid Alam
*Assistant Examiner* — Dawaune Conyers

(57) ABSTRACT

Computational units of any task may run in different silos. In an embodiment, a search query may be evaluated efficiently on a non-uniform memory architecture (NUMA) machine, by assigning separate chunks of the index to separate memories. In a NUMA machine, each socket has an attached memory. The latency time is low or high, depending on whether a processor accesses data in its attached memory or a different memory. Copies of an index manager program, which compares a query to an index, run separately on different processors in a NUMA machine. Each instance of the index manager compares the query to the index chunk in the memory attached to the processor on which that instance is running. Thus, each instance of the index manager may compare a query to a particular portion of the index using low-latency accesses, thereby increasing the efficiency of the search.

20 Claims, 7 Drawing Sheets

LEVERAGING LOW-LATENCY MEMORY ACCESS

BACKGROUND

One aspect of a machine's architecture is the way that the machine's processor(s) are connected to memory. The motherboard of a machine typically contains one or more sockets for processors, and a chipset that, among other things, contains a northbridge that connects the processor(s) to the memory(ies). In what is referred to as a uniform memory architecture (UMA), each processor socket is equidistant from the memory. In a UMA, processor sockets are typically connected to a single northbridge, which connects all of the sockets to one or more memory modules. In a UMA, the latency time for a memory access does not depend on which processor makes the access request. In a non-uniform memory architecture (NUMA), each socket has locally-attached memory. Any processor on a NUMA motherboard can access any processor's locally-attached memory. However, the latency time is lower when a processor accesses the locally-attached memory on its own socket than when the processor accesses memory attached to other sockets.

On a NUMA machine, platform firmware normally implements an interleaving memory policy, which is designed to distribute data evenly across the different memories. For a given memory access requested by a processor, the latency time is lower or higher depending on whether the accessed data resides in the processor's locally-attached memory or in a different memory. Since the threads that access data could be scheduled on any processor, and since the interleaving policy could distribute the data to any memory, whether a given memory access request will have a low or high latency time is largely a matter of random chance. Over a large number of access requests, the average latency time is somewhere between the low latency time for accessing a processor's locally-attached memory and the high latency time for accessing some other processor's attached memory.

Leaving the access latency to random chance makes sense when nothing is known about the data or the programs that will be accessing the data. However, where something is known about the data, there are opportunities to leverage the architecture of a NUMA machine to reduce the average latency time. If a processor accesses only (or mainly) its local memory, the average latency time for requests coming from that processor will tend to be lower than the average number produced by random chance. However many applications, such as search, have not been structured to leverage this aspect of NUMA machines.

SUMMARY

Search functionality may be implemented on a NUMA architecture by storing different portions of the index in the memories attached to different processors. A program that compares a search query to the index may be run on each processor. The program may be designed to compare the query to the portion of the index stored in the memory that is locally-attached to the processor on which the program is running. When a processor runs such a program, the processor tends to make access requests to its locally-attached memory rather than to the memory of other processors. This design allows a query to be compared to a portion of an index, while avoiding many high latency requests to other processors' attached memories. In this way, the low latency time available for certain access requests on a NUMA machine may be leveraged to increase the efficiency of a search.

Typically, search is performed by slicing an index into chunks. A query may be processed by separately comparing the keywords in the query to each chunk of the index, and then aggregating the results of the separate comparisons. When a NUMA machine is used, each locally-attached memory may store a different chunk of the index. An index manager program compares query keywords to index chunks. The index manager may be instantiated plural times on the machine, and each instance of the index manager may be affinitized to a particular processor. Thus, a given instance of the index manager may execute on the processor(s) in a particular socket and may look specifically at the index chunk stored in that socket's locally-attached memory, rather than looking at chunks stored in other memories. When a query is to be processed, copies of the query may be dispatched, separately, to the different instances of the index manager running on the NUMA machine. Each instance may compare the query to a particular chunk of the index. Since the index chunk that a given instance of the index manager searches is stored in the locally-attached memory for the processor on which that instance executes, comparing a query to an index chunk can be done with low-latency memory accesses, thereby leveraging the design of the NUMA machine.

In addition to search applications running on NUMA machines, concepts described herein may be used to divide a machine (or machines) into silos, and to perform different computational units of a task on the different silos. One example of using different silos is to assign different chunks of an index to be handled by different processors in different sockets. However, that search scenario is merely one example of assigning different parts of a task to different silos.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
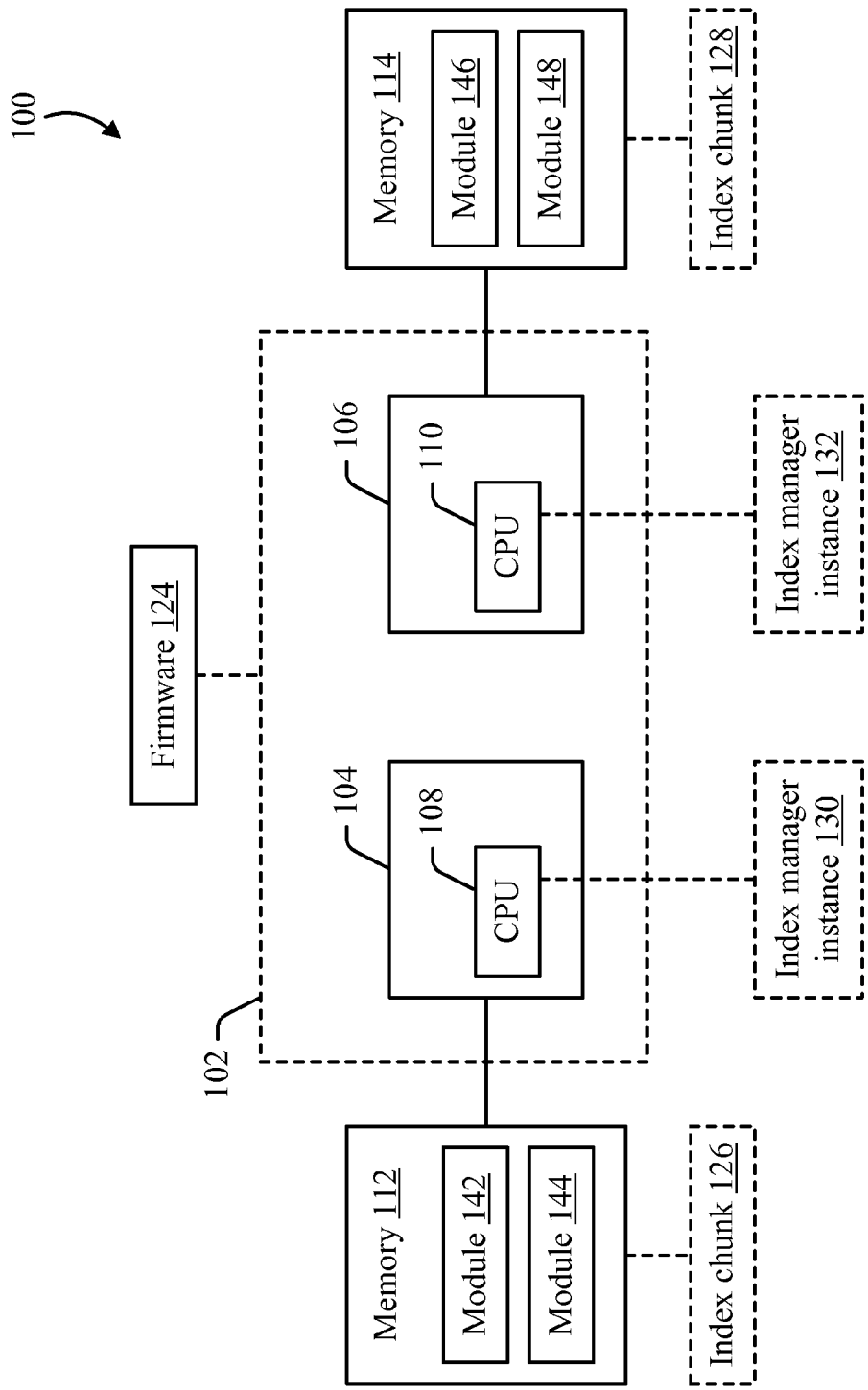
FIG. 1 is a block diagram of an example architecture in which different index chunks may be deployed to different memories.

Search queries are typically evaluated by comparing keywords in the query to an index. The index typically contains a list of keywords, and a set of documents associated with each keyword. Thus, for a given keyword (e.g. "dog"), the index may contain a list of document that contain (or are otherwise associated with) the word "dog." After each keyword in the query is compared with the index, a list of results ("hits") may be provided based on which documents in the index are found to be associated with the keywords.

In theory, one monolithic index could be stored, and a query could be evaluated by making a comparison of the keywords in the query with that entire index. In practice, indices are too large to be managed in this way. Thus, an index is typically sliced into different chunks, and the query is separately compared to each chunk. Evaluating the query separately against separate index chunks may not affect the overall result. For example, the monolithic version of the index might say that the keyword "dog" is associated with documents A, B, C, and D. When the index is sliced into chunks, one chunk might say "dog" is associated with documents A and B, and the other chunk might say "dog" is associated with documents C and D. If the task is to find documents associated with the word "dog", it makes no difference in the result whether one searches the monolithic version and finds all four documents {A,B,C,D}, or separately searches the two chunks and separately finds {A,B} in one chunk and {C,D} in another chunk. In the latter case, after {A,B} and {C,D} have been found separately, these two partial results can be aggregated to produce the same result—{A,B,C,D}—that would have been obtained by searching the monolithic version of the index.

In a typical implementation of a search engine, the index is sliced into many chunks and distributed to several machines. When a query is to be evaluated, front-end dispatch logic dispatches the same query to the various machines that manage chunks of the index, and then aggregates the results from each machine. A typical arrangement is to have each machine responsible for a specific chunk. A program (e.g., an "index manager") on each machine, compares the keywords in the query to the index chunk stored in that machine. From the perspective of the dispatch logic, each machine is the atomic unit that is responsible for a chunk. Thus, the dispatch logic dispatches the query once to each machine.

Although the query is dispatched once to each machine, after the query arrives at the machine it is actually processed using several different components of the machine. A machine is likely to have several memory modules and several processors (or processor cores). The program that compares keywords to the index may be multi-threaded, and may execute in parallel on the different processors or cores. Different portions of the index may be stored in different memory modules. Thus, at any given time, some aspect of the search might be executed by any of the processors and might involve any memory module on the machine. This strategy is reasonable when the index manager is implemented on an UMA machine, since—in such a machine—the combination of processor and memory involved in a particular operation does not affect the amount of time involved in performing the operation. However, in a NUMA machine, the latency time to perform a memory access does depend on the particular combination of processor and memory that is involved in an access request. Since each processor socket in a NUMA architecture has a locally-attached memory, the latency time between the socket and its locally-attached memory may be lower than the latency time between that socket and other memories within the machine. Thus, requests made by a processor to its locally-attached memory tend to take less time than requests made by a processor to some other memory in the machine.

The subject matter herein allows search to be implemented efficiently by leveraging the low latency times available for local memory accesses on a NUMA machine. Search is one example of an application that may be able to leverage the design of a NUMA machine. However, the techniques described herein could also be used with other applications that can separately operate on data that has been divided into portions. Moreover, as further described below, tasks other than search could be implemented, and/or architectures other than NUMA architectures could be used.

Turning now to the drawings, FIG. 1 shows an example architecture 100 in which different index chunks may be deployed to different memories. Architecture 100 may comprise a motherboard 102 that has a plurality of sockets into which central processing units may be installed. For example, FIG. 1 shows sockets 104 and 106. Central processing units (CPUs) may be installed in the sockets. In the example of FIG. 1, CPU 108 is installed in socket 104, and CPU 110 is installed in socket 106. CPUs 108 and 110 may be any type of processor, such as a single-core processor, a multi-core processor, etc.

Motherboard 102 may support the notion of local memory for a particular socket. Thus, socket 104 has locally-attached memory 112, and socket 106 has locally attached memory 114. The locally memory for a socket could take any form: e.g., dual inline memory modules (DIMMs), small outlet dual inline memory modules (SODIMMs), etc. Each memory may comprise one or more modules (e.g., modules 142 and 144 for memory 112, and modules 146 and 148 for memory 114).

Because of the way that memory 112 is connected to socket 104, the CPU installed in socket 104 (CPU 108, in this example) is able to access memory 112 with a lower latency time than would be involved in that CPU's accessing of some other memories. Similarly, because of the way that memory 114 is connected to socket 106, the CPU installed in socket 106 (CPU 110, in this example) is able to access memory 114 with a lower latency time than would be involved in that CPU's accessing some other memories. Thus, CPU 108 may be able to perform a memory operation (e.g., read or write) with memory 112 faster than it could perform a memory operation with memory 114, and CPU 110 may be able to perform a memory operation with memory 114 faster than it could perform a memory operation with memory 112. Architecture 100 is, therefore, an example of a non-uniform memory architecture (NUMA), in the sense that processors may have different latency times to access different memories, rather than having the latency time be uniform for all memory-processor combinations. Physical implementations of NUMA are generally known.

The way in which data is distributed across the various memories within architecture 100 may be determined by firmware 124. Firmware 124 may be installed on a machine platform that is built according to architecture 100. Firmware 124 may implement an interleaving policy that specifies that data is to be distributed across different memories within architecture 100 (e.g., memories 112 and 114), in order to avoid situations where data tends to aggregate in one memory and where the other memory is left unused. (Such situations are sometimes referred to as "hotspots.") Since CPUs 108 and 110 access memories 112 and 114 with different latency times, creating a data hotspot on memory 112 would tend to cause memory accesses from CPU 108 to be quick and those from CPU 110 to be slow. Thus, firmware 124 may implement an interleaving policy in which virtual memory pages are assigned to different physical memories in some pattern. For example, the policy may call for even numbered pages to be stored on memory 112 and for odd numbered pages to be stored on memory 114. Or, the policy may constitute some other rule that makes it likely that pages will be distributed across the different memories. Such a policy makes it likely that the various CPUs will have about the same average access time to the data as a whole, although their respective access times to different individual pieces of data may differ depending on where the data is stored. Arbitrarily interleaving the data across the different memories makes sense when nothing is known about the organization of the data or how it will be used. However, the subject matter herein allows a NUMA architecture to perform certain tasks quickly by leveraging knowledge of the data that will be placed in the memories, and how the CPUs will use that data. Thus, firmware 124 may be replaced or modified to implement a different policy that may keep data in the memory that is associated with the processor that will use the data. Such a policy, and its use with index-searching software, is described below.

One task that may be performed by a computer is to search an index. That task is often done as part of performing a web search, or any other type of search. An index associates keywords with documents. Thus, in a typical search algorithm, the keywords in a query are compared with the index to determine what documents contain (or are otherwise associated with the keyword). When the index is large, it may be sliced into several "chunks." Keywords may be separately compared to the different chunks, and the results from each chunk may be aggregated. Thus, if the keyword is "dog," it is theoretically possible to search one big index that lists all of the documents associated with various keywords (including the keyword "dog"). Or, the index may be divided into chunks, and the keyword may be evaluated against each chunk separately. So, if the first chunk identifies documents A and B as being associated with the word "dog," and the second chunk identifies documents C and D as being associated with that word, the aggregate result is that documents A, B, C, and D are all hits on the word dog. If the first and second chunks had been part of one monolithic index, then evaluating the word "dog" against that index would have shown documents A, B, C, and D as results. However, dividing the index into chunks, searching the chunks separately, and then aggregating the intermediate results is often more efficient than searching one large index and ultimately produces the same results.

When an index is divided into chunks, the structure of a NUMA may be leveraged to search the different chunks efficiently. An index may be divided into two chunks 126 and 128. Index chunk 126 may be stored in memory 112 and index chunk 128 may be stored in memory 114. Since index chunk 126 is in the memory that is local to CPU 108, index chunk may be accessed by CPU 108 with relatively low latency time. Likewise, index chunk 128 may be accessed by CPU 110 with relatively low latency time.

One way to implement an index search on architecture 100 is to run separate instances 130 and 132 of an index manager on separate CPUs. Instance 130 runs on CPU 108, and instance 132 runs on CPU 110. The index manager is a program that compares a query to an index by determining which document(s) the index associates with a keyword from the query. A given instance of the index manager looks at the index chunk in the local memory associated with the processor on which the instance is running. Thus, instance 130 of the index manager compares a query to index chunk 126, and instance 132 compares a query to index chunk 128. By configuring the index manager program to evaluate the query against the index chunk in the local memory for the processor on which a particular instance of the index manager is running (rather than evaluating the query on an index chunk stored outside of that local memory), the index manager avoids high-latency access to other processor(s)' local memory, and leverages the low latency time of accessing the memory associated with a particular processor. Normally, a machine might schedule a process (or its various threads) to run on any available CPU. However, in one example implementation described herein, instance 130 may be excluded from executing on CPU 110, and instance 132 may be excluded from executing on CPU 108.

Figure 2:
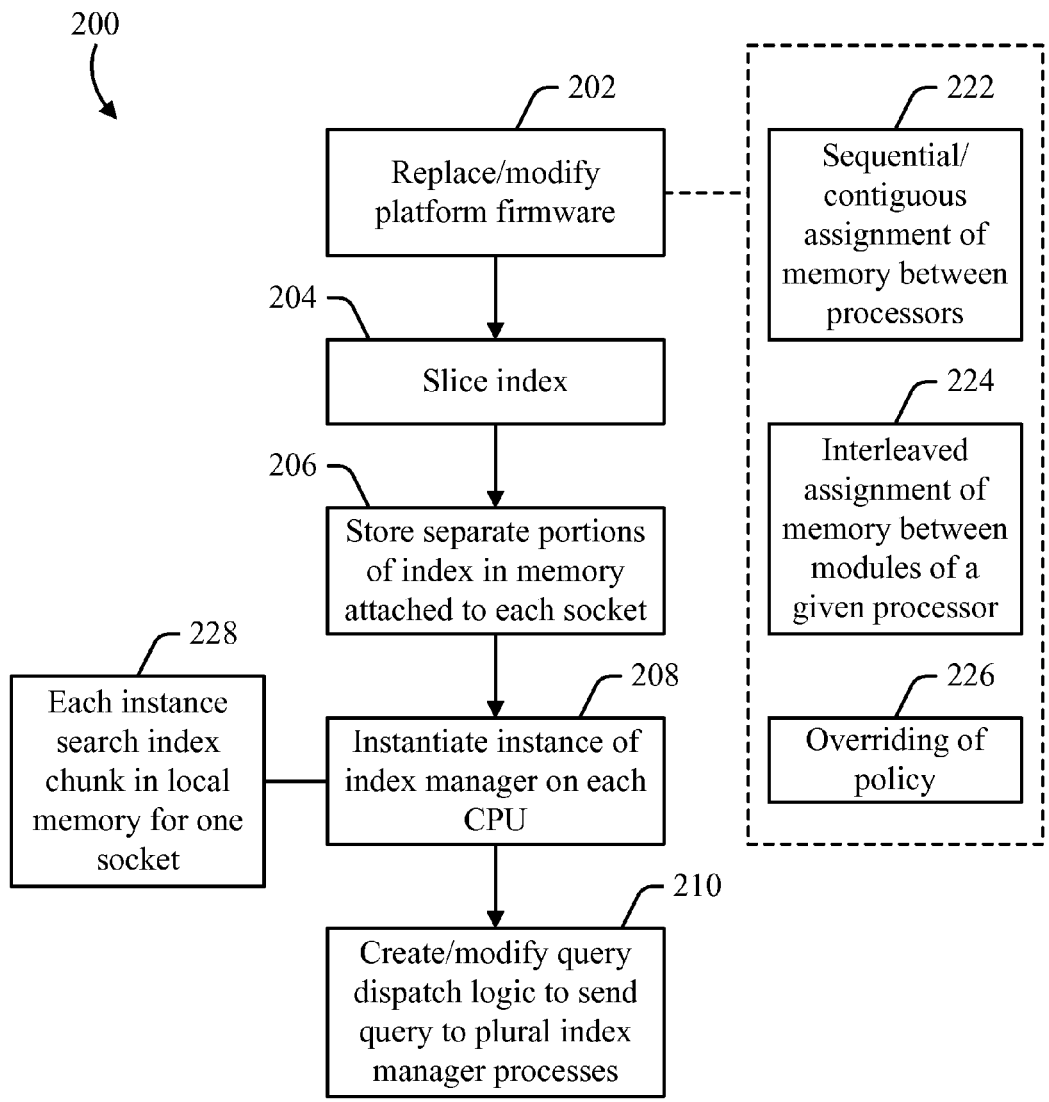
FIG. 2 is a flow diagram of an example process that may be used to prepare a machine to participate in a search.

FIG. 2 shows an example process 200 that may be used to prepare a NUMA machine to participate in a search. Before turning to FIG. 2, it is noted that the process of FIG. 2 may be used to leverage the memory-access latency features of a NUMA machine, as described above. However, the process of FIG. 2 may be performed for any reason and in any context. Additionally, the flow diagrams shown here (both in FIG. 2 and in FIG. 5) show examples in which stages of a process are carried out in a particular order, as indicated by the lines connecting the blocks, but the various stages shown in these diagrams may be performed in any order, or in any combination or sub-combination.

Returning now to FIG. 2, at 202 the firmware on a NUMA machine may be modified or replaced to implement a particular memory policy. As described above, NUMA machines typically have firmware that implements an interleaving policy that distributes virtual memory pages roughly evenly across the different locally-attached physical memories in the machine. However, in order to leverage the low-latency time that is achieved when a CPU accesses data in its locally attached memory, the firmware may be replaced and/or modified to implement a policy that associated certain ranges of virtual addresses with a particular physical memory. There may be various aspects to such a policy. One such aspect is sequential assignment of memory between processors (block 222). For example, suppose there are two processors, each with a locally-attached memory (e.g., CPUs 108 and 110, having locally-attached memories 112 and 114, respectively, as shown in FIG. 1). Moreover, suppose that there are N megabytes of memory. Then CPU 108 could be assigned addresses from zero to (N/2)−1, and CPU 110 could be assigned addresses from N/2 to N−1. This scheme is an example in which each processor is assigned a contiguous block of addresses, and where each processor's numerical range of addresses is exclusive of the other processor's range of addresses. Another example aspect of the policy is that interleaving may be permitted across different components that make up a particular processor's local memory (block 224). For example, If memories 112 and 114 are implemented as separate components (e.g., if the local memory for one processor is implemented through separate memory modules, such as a plurality of DIMMs), then the policy could use a form of interleaving to distribute data across the several components, even if a contiguous range of addresses is assigned to each processor's local memory. Implementing the policies shown at blocks 222 and/or 224 may involve overriding (block 226) the default memory policy applied by the firmware.

At 204, an index that is to be searched may be sliced, to create a plurality of chunks of the index. At 206, different chunks of the index may be stored in the various local memories for each processor. For example, if there are n index chunks, one chunk may be stored in memory 112, and another chunk may be stored in memory 114. (Memories 112 and 114 are shown in FIG. 1.) When the memory policy for a machine assigns a particular range of addresses to a particular processor's local memory, it may be relatively easy to direct a particular index chunk to a particular memory. For example, if addresses in the range zero to (N/2)−1 are assigned to memory 112, then an index chunk may be stored in memory 112 by writing the data in the index chunk to addresses that fall in the range zero to (N/2)−1. However, any technique could be used to direct that an index chunk be stored in a particular memory. Using the memory policy to control which numerical addresses are assigned to a given memory is merely one such technique.

At 208, an instance of an index manager may be instantiated on each of the various processors. For example, instances 130 and 132 of an index manager could be instantiated on CPUs 108 and 110, respectively (as shown in FIG. 1). In normal operation of a multi-processor system, a scheduler assigns a thread to execute on an arbitrary processor, and a program may be scheduled on more than one processor during the course of the program's operation. However, each of the different instances of the index manager may be affinitized to a processor in the sense that each instance executes on a specific processor, rather than being arbitrarily scheduled on either processor. Moreover, each instance may search the index chunk in the local memory attached to a particular socket (block 228), rather than searching all of the memory on the machine. Thus, with reference to the example of FIG. 1, instance 130 of the index manager might evaluate keywords in a query only against the index chunk stored in memory 112, and instance 132 might evaluate the keywords only against the index chunk stored in memory 114.

Figure 3:
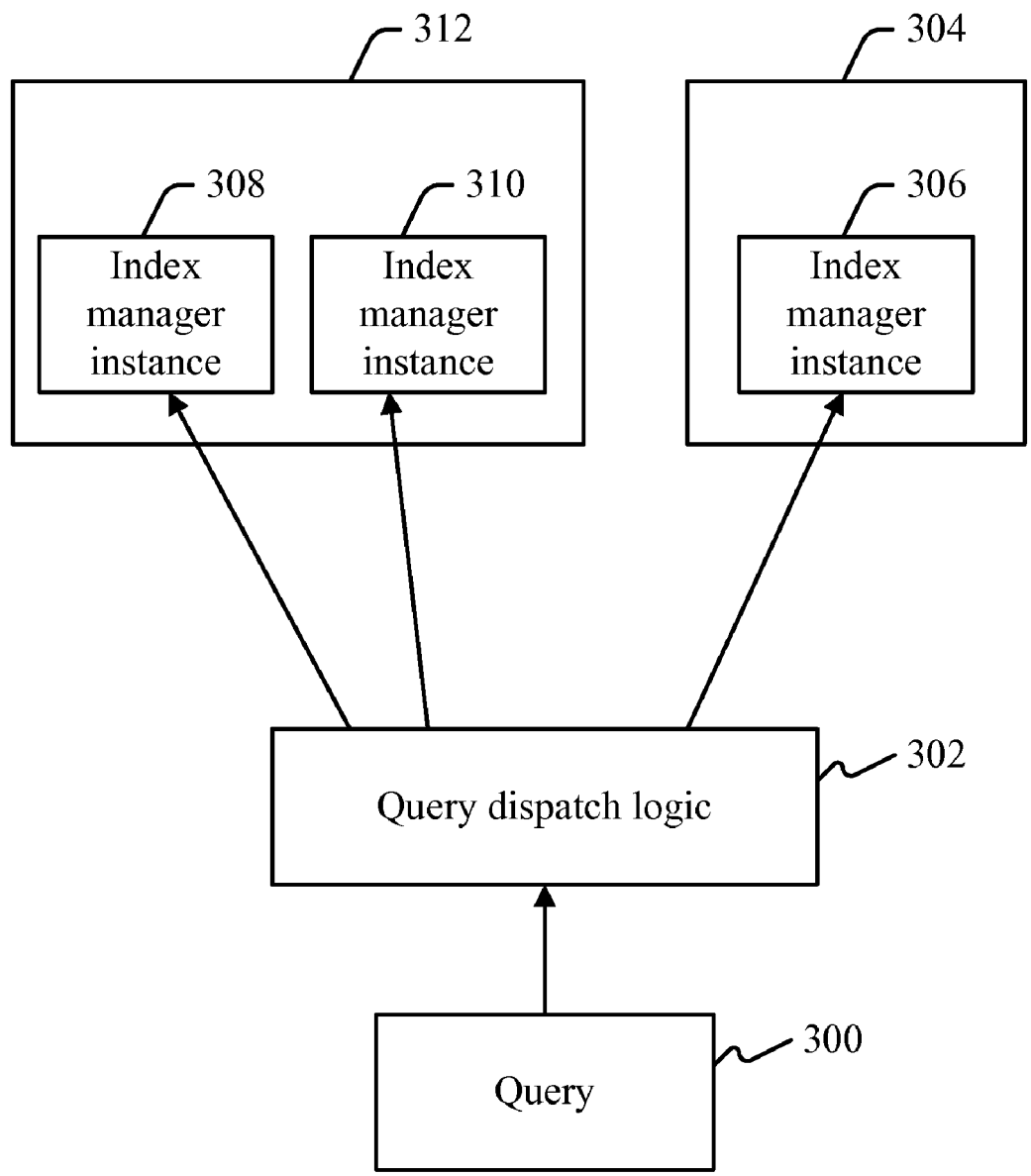
FIG. 3 is a block diagram of an example index manager that dispatches a query.

At 210, logic that dispatches queries to the index manager may be created (or existing logic may be modified), in order to dispatch queries to the different instances of the index manager that are running on the different processors. Queries are sometimes processed in parallel by several different machines. As shown in FIG. 3, a query 300 may be received by query dispatch logic 302 (sometimes referred to herein as a dispatcher), which forwards the query to various instances of the index manager. Normally, each machine runs a single instance of the index manager, which evaluates the query against whatever portion of the index is stored in that machine's memory. Thus, query dispatch logic 302 normally dispatches each query to one index manager on each machine. For example, query dispatch logic 302 dispatches query 300 to instance 306 of the index manager running on machine 304. However, when a machine runs different instances of the index manager on each of its processors, query dispatch logic 302 may be created and/or modified to understand that each machine may be running plural instances of the index manager, and thus the query may be dispatched separately to those plural instances. Thus, query dispatch logic 302, as created or modified in this manner (at 210 of FIG. 2), dispatches query 300 to two separate instances of the index manager (308 and 310), even though both instances run on the same machine 312.

Figure 4:
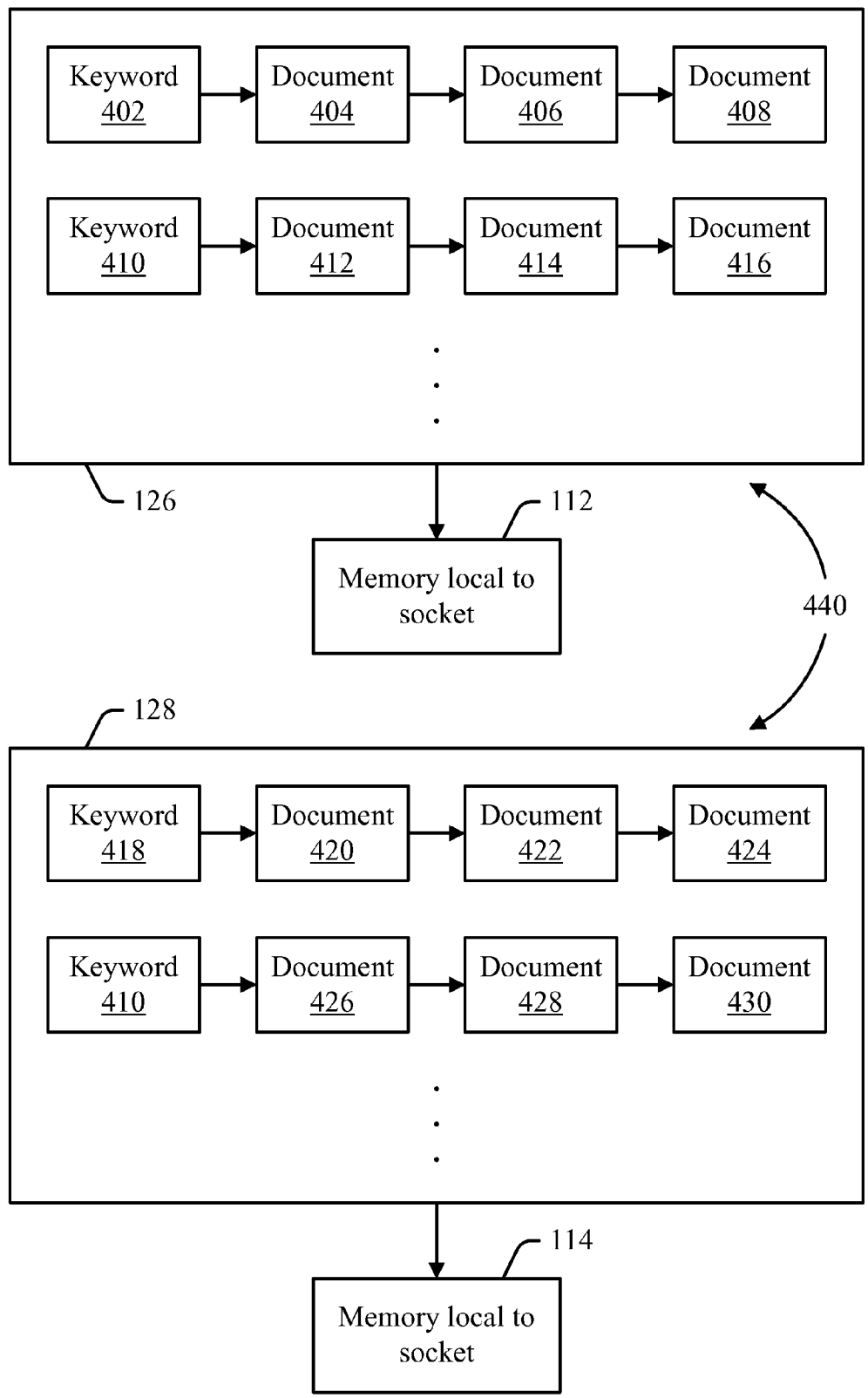
FIG. 4 is a block diagram of an example scenario in which different index chunks are stored in different memories.

FIG. 4 shows an example scenario in which different index chunks 126 and 128 are stored in different memories. (Index chunks 126 and 128 may collectively make up index 440. Index 440 may include index chunks 126 and 128, and may also include one or more other index chunks.) Index chunk 126 may be stored in memory 112, which is attached to a first processor. Index chunk 128 may be stored in memory 114, which is attached to a second processor. Index chunks 126 and 128 may take the form of a set of keywords, and documents associated with those keywords. For example, index chunk 126 indicates that keyword 402 is associated with documents 404, 406, and 408, and that keyword 410 is associated with documents 412, 414, and 416. For example, keyword 402 might be "dog", and documents 404-408 may be documents that contain the word "dog." Similarly, index chunk 128 indicates that keyword 418 is associated with documents 420, 422 and 424, and that keyword 410 is associated with documents 426, 428 and 430. Index chunks 126 and 128 may contain some overlapping keywords. For example, index chunks 126 and 128, in this example, both contain entries for keyword 410, but indicate different sets of documents associated with that keyword.

A query may be evaluated by comparing the keywords in the query with both index chunks, and then aggregating the results. For example, a query that contains the keyword 410 could be evaluated against index chunk 126 (which identifies documents 412-416 as hits on that keyword) and against index chunk 128 (which identifies documents 426-430 as hits). The aggregate result would identify documents 412-416 and 426-430 as hits. One way to compare a query against different index chunks is to use the structure shown in FIG. 1, where separate index chunks are stored in separate memories, and separate instances of an index manager compare the query with each index chunk.

Figure 5:
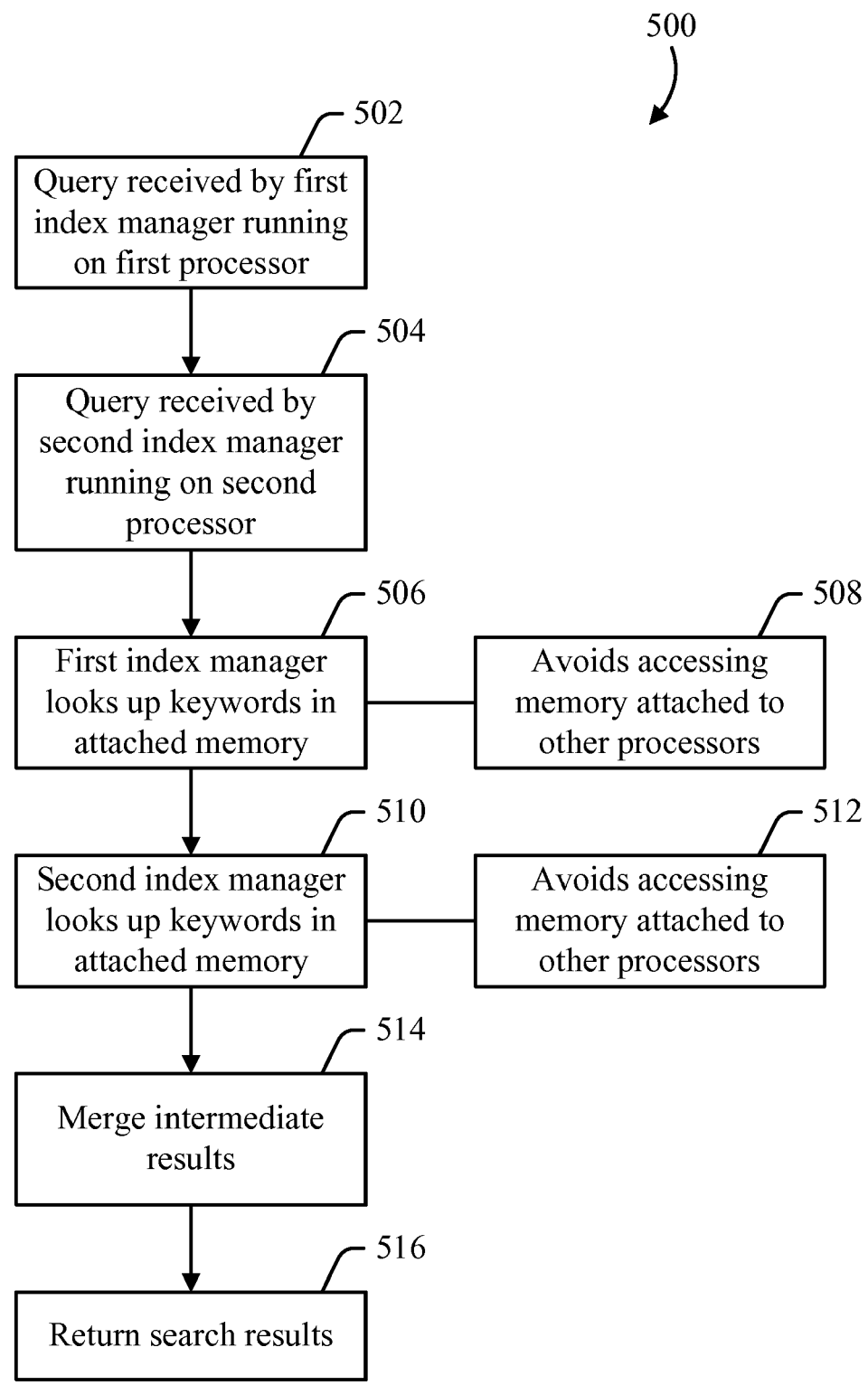
FIG. 5 is a flow diagram of an example process in which a query may be evaluated using separate portions of an index.

FIG. 5 shows an example process 500 in which a query may be evaluated using separate index chunks. The separate index chunks could be separately stored in the locally-attached memories of two processors, although process 500 could be performed in any context using any components.

At 502, a query may be received by a first index manager running on a first processor. At 504, the query may be received by a second index manager running on a second processor. For example, with reference to FIG. 1, a query could be dispatched to instances 130 and 132 of an index manager.

At 506, the first instance of the index manager looks up the keyword(s) in the query. The lookup may be performed by comparing the query to the index chunk stored in the memory that is locally-attached to the processor on which the first instance of the query manager is running. During this lookup, the index manager instance may avoid looking in memory that is locally-attached to other processors, even if such other memories are physically accessible (block 508). As described above, accessing the memory attached to other processors may have a higher latency time than accessing memory attached to the processor from which the access is being performed. Thus, by limiting the lookup of keywords to those in the index chunk stored in locally attached memory, the time to perform the lookup is lower than it would be if the lookup involved accessing other memories.

At 510 the second index manager looks up the keywords(s) in the query. The lookup is performed against the index chunk that is stored in the memory that is locally-attached to the processor on which the second instance of the query manager is running. The query evaluated by the second index manager may be the same query that is evaluated by the first index manager. The second index manager may also avoid accessing memory attached to processors other than the one on which the second index manager is executing (block 512).

At 514, intermediate results generated by the two index managers may be merged. For example, the first instance of the index manager may return a set of documents that match the words in a query (based on the documents that the first index chunk associates with those words), and the second instance of the index manager may return a different set of documents that match the words in the query (based on the documents that the second index chunk associates with those words). These results may be merged at 514. At 516, the aggregated search results may be returned.

The foregoing describes an example in which there are two instances of an index manager separately comparing words in a query with two separate index chunks. However, there could be any number of instances of an index manager, and any number of index chunks.

Figure 6:
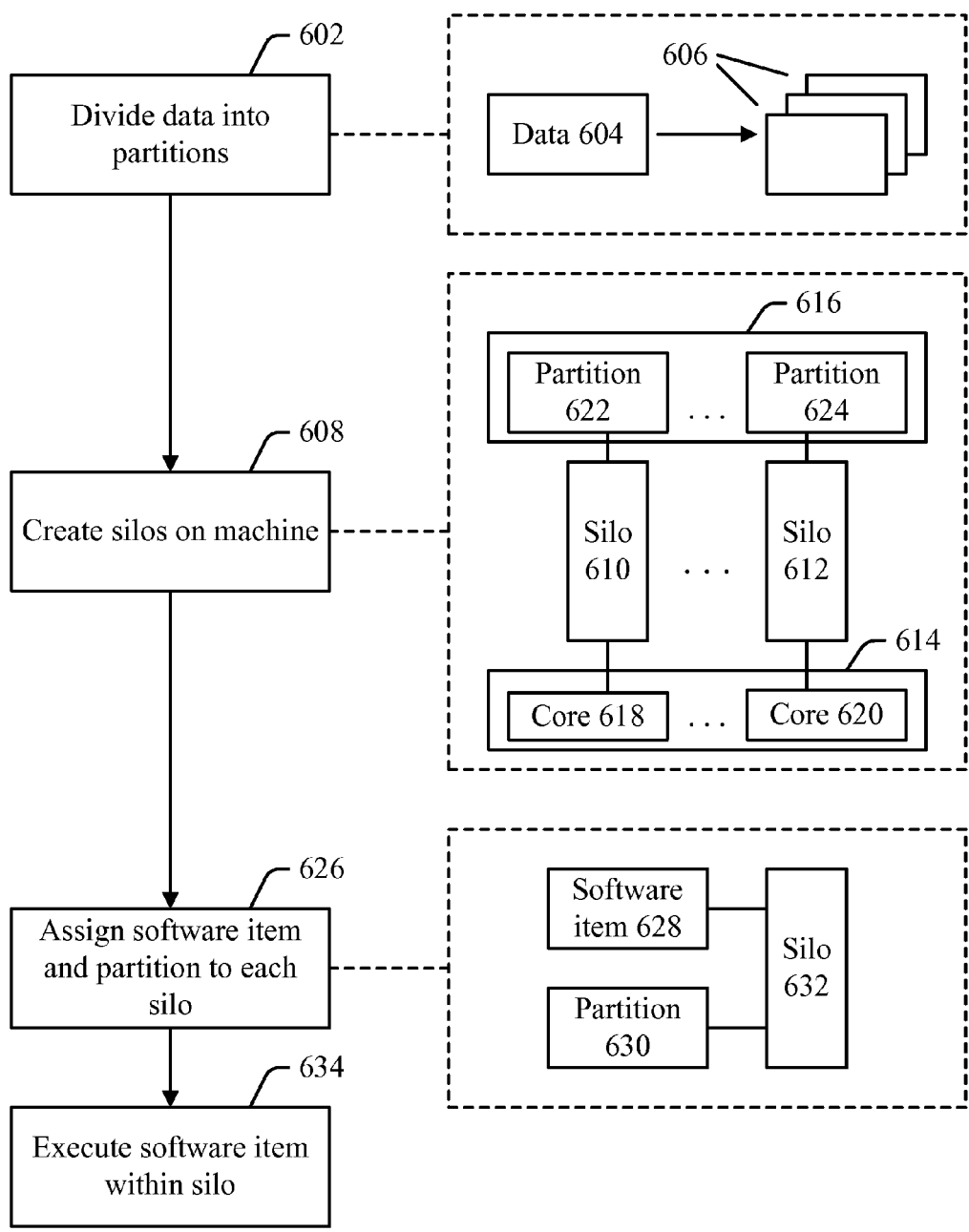
FIG. 6 is a flow diagram of an example process to prepare a machine to perform a task.

FIG. 6 is a flow diagram of an example process to prepare a machine to perform a task. As described below, the task may be divided into computational units, and the data on which the task is to be performed could be divided into partitions. One example of a task is searching an index, where each instance of an index manager may be and/or perform a computational unit, and where each index chunk is an example of a partition of some larger piece of data (the entire index). However, the task mentioned in connection with FIG. 6 could be any task (of which search is merely an example), and the data on which the task operates could be any kind of data.

At 602, data may be divided into partitions. For example, data 604 may be divided into partitions 606, as shown in the box enclosed in a dotted line.

At 608, silos may be created on a machine. A silo may be any division (logical or physical) of a machine that observes some separateness with other parts of the machine. Thus, a silo could be an area that is given specific computational resources of a machine and a portion of the machine's memory. Within the dotted line enclosure, an example is shown in which several silos are created. (Two silos 610 and 612 are shows by way of example, although there could be any number of silos.) The machine on which silos 610 and 612 are created may have hardware such as processor 614 and memory 616. Processor 614 may, for example, be a multi-core processor (of which two cores 618 and 620 are shown, by way of example). Thus, each silo 610 may be assigned one of the cores (e.g., cores 618 and 620 may be assigned to silos 610 and 612, respectively, and, in one example, there may be at least the number of cores as the number of silos, so that each silo could have its own core). Additionally, silos may be assigned portions of memory 616 (e.g., portions 622 and 624 of memory 616 may be assigned to silos 610 and 612, respectively). For example, each silo could be assigned a sequential set of page ranges within memory 616 (e.g., silo 610 could have page ranges zero through n, silo 612 could have page ranges n+1 through 2n, and so on). Thus, a given silo may be assigned computational resources and/or a portion of the memory. Examples above show situations in which a given instance of an index manager is assigned to execute on the (single- or multi-core) processor in one socket, and to operate on an index chunk stored in the local memory attached to that socket. In those examples, a given processor and its attached memory can be considered a silo, although a silo may take other forms.

At 626, an item of software and a partition may be assigned to each silo. The item of software may perform a particular computational unit of an underlying task. In prior examples, comparing a query to a particular index chunk may be considered a computational unit of a task (in which case the full task may be comparing the query to the entire index). In such an example, each instance of an index manager performs a computational unit of the task. It is noted that, in such an example, each item of software is an instance of the same underlying program. However, the items of software assigned to different silos could be different programs rather than different instances of the same program. FIG. 6 shows an example of one particular silo, and its assigned software item and partition. In this example, software item 628 and partition 630 are assigned to silo 632. Each silo may be assigned its own software item and/or partition, so silos other than silo 632 may each have their own software item and/or partition. Partition 630, as described above, may be a partition of some large piece of data—e.g., a chunk of an index. Thus, in one example, software item 628 may be an instance of an index manager, and partition 630 may be a chunk of an index.

Each item of software may be designed to act with awareness that it is executing in a silo on a machine in which other silos exist. Thus, to the extent that an item of software has the physical capability to access resources (e.g., processor cores, memory ranges, etc.) outside of its assigned silo, the item of software could be designed not to do so, to avoid interfering with operations in other silos. As one example, the index manager described above could be programmed so as to understand that different instances of itself may operate on the same machine. Thus, the index manager could be designed so that one instance avoids accessing memory and/or processor assigned to the silos in which other instance(s) of the index manager execute.

At 634, a software item may be executed within a silo. If there are plural silos, then each software item may be executed within its silo (and may operate on the partition of data store in that silo's memory.)

Figure 7:
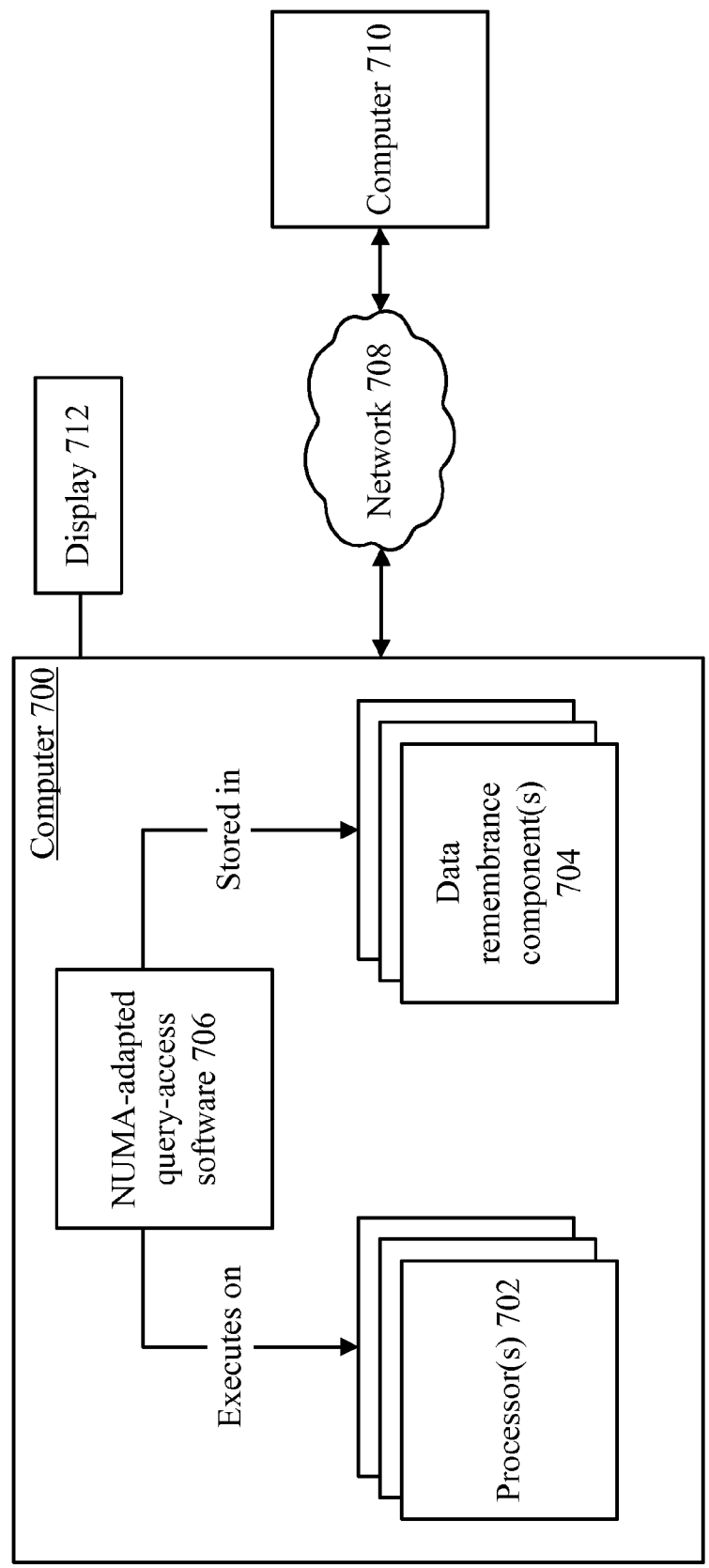
FIG. 7 is a block diagram of example components that may be used in connection with implementations of the subject matter described herein.

FIG. 7 shows an example environment in which aspects of the subject matter described herein may be deployed.

Computer 700 includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 700 may be an example of a machine that includes the motherboard, sockets, CPUs, and/or memory shown in FIG. 1. Computer 700 may comprise, or be associated with, display 712, which may be a cathode ray tube (CRT) monitor, a liquid crystal display (LCD) monitor, or any other type of monitor.

Software may be stored in the data remembrance component(s) 704, and may execute on the one or more processor(s) 702. An example of such software is NUMA-adapted query-access software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A computer in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as software having instructions to perform one or more acts of a method, where the instructions are stored on one or more computer-readable storage media. The instructions to perform the acts could be stored on one medium, or could be spread out across plural media, so that the instructions might appear collectively on the one or more computer-readable storage media, regardless of whether all of the instructions happen to be on the same medium.

In one example environment, computer 700 may be communicatively connected to one or more other devices through network 708. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system to evaluate a query, the system comprising:
a first socket in which a first processor is installed;
first memory connected to the first socket;
a second socket in which a second processor is installed;
second memory connected to the second socket, memory accesses in which said first processor accesses said first memory or in which said second processor accesses said second memory having a lower latency time than memory accesses in which said first processor accesses said second memory or in which said second processor accesses said first memory;
a first chunk of an index stored in said first memory;
a second chunk of said index stored in said second memory;
a first instance of a program, wherein the first instance compares the query to the first chunk by comparing the query to keywords stored in said first memory but not to keywords stored in said second memory; and
a second instance of the program, where the second instance compares the query to the second chunk by comparing the query to keywords stored in said second memory but not to keywords stored in said first memory.

2. The system of claim 1, wherein said first socket and said second socket are part of one machine, and wherein the system further comprises:
a dispatcher that dispatches said query to said first instance of the program and to the second instance of the program.

3. The system of claim 1, wherein the first processor and the second processor are each multi-core processors.

4. The system of claim 1, wherein the first instance of the program executes on the first processor and is excluded from executing on the second processor, and wherein the second instance of the program executes on the second processor and is excluded from executing on the first processor.

5. The system of claim 1, wherein said first memory is assigned a first sequential range of addresses, and wherein said second memory is assigned a second sequential range of addresses.

6. The system of claim 1, wherein said first memory comprises one or more memory modules, and wherein said second memory comprises one or more memory modules.

7. The system of claim 6, wherein said first memory is assigned a first sequential range of addresses, wherein said second memory is assigned a second sequential range of addresses, wherein said first memory comprises at least two memory modules, wherein said second memory comprises at least two memory modules, and wherein the system further comprises:
firmware that interleaves data between the memory modules that are part of a given memory, but does not interleave data across different memories.

8. A method of evaluating a query, the method comprising:
receiving the query at a first instance of a program that compares queries with an index, said first instance running on a first processor of a machine;
receiving the query at a second instance of said program, said second instance running on a second processor of said machine;
using said first instance to look up keywords of the query in a first chunk of said index that is stored in a first memory;
using said second instance to look up keywords of the query in a second chunk of said index that is stored in a second memory, accesses of said first memory by said first processor and accesses of said second memory by said second processor having a lower latency time than accesses of said first memory by said second processor or accesses of said second memory by said first processor; and
returning a result, said result being based on comparison of the query with said first chunk and with said second chunk.

9. The method of claim 8, further comprising:
merging an intermediate result from said first instance and an intermediate result from said second instance to create said result.

10. The method of claim 8, wherein said first memory is local to a first socket in which said first processor is installed, and wherein said second memory is local to a second socket in which said second processor is installed.

11. The method of claim 10, wherein said first instance avoids accessing data in a memory other than said first memory.

12. The method of claim 8, wherein said first processor and said second processor are each multi-core processors.

13. The method of claim 8, wherein said machine implements a memory policy that interleaves data between said first memory and said second memory, and wherein the method further comprise:
overriding the policy by assigning a first contiguous range and a second contiguous range of addresses to said first memory and said second memory, respectively.

14. The method of claim 8, wherein said first memory comprises a first memory module and a second memory module, wherein said machine implements a memory policy that interleaves data between said first memory and said second memory, and wherein the method further comprises:
overriding the policy by permitting interleaving between said first memory module and said second memory module, but not between said first memory and said second memory.

15. A method of preparing a machine to perform a task, the method comprising:
dividing data involved in performing the task into a number of partitions;
creating said number of silos on one processor of said machine, said processor having a plurality of cores, there being at least as many cores as said first number;
assigning, to each of said silos, an item of software that performs a computational unit of the task and one said partitions; and
executing each item of software, within its respective silo, to operate on the partition in that item of software's silo, said task comprising comparing a query to an index, said data comprising said index, each of said partitions comprising a slice of said index, each item of software comprising an instance of a search program that compares said query to a slice of the index that is assigned to the silo in which that instance executes, slices of said index comprising overlapping keywords such that the slice assigned to a first one of the silos comprises a word, the slice assigned to a second one of the partitions comprises said word, and the slice assigned to the first partition associates said word with a different set of documents than the slice assigned to the second partition.

16. The method of claim 15, wherein each of said silos comprises a core and a portion of a memory, and wherein a partition that is assigned to a silo is stored wholly within the portion of the memory that is assigned to the silo.

17. The method of claim 16, wherein each silo's portion of the memory comprises a sequential set of memory pages.

18. The method of claim 15, wherein the software in one of the silos avoids accessing data in any of the other silos.

19. The method of claim 15, wherein said processor installed in a socket of said machine, there being a memory attached to said socket.

20. The method of claim 15, said machine implementing a memory interleaving policy, said method comprising:
   overriding said memory interleaving policy to assign contiguous ranges of addresses to data in each silo.

* * * * *